(12) United States Patent
Sato et al.

(10) Patent No.: US 6,415,222 B1
(45) Date of Patent: Jul. 2, 2002

(54) NAVIGATION SYSTEM AND STORAGE MEDIUM

(75) Inventors: Mitsuru Sato; Kazuhiro Oya, both of Aichi (JP)

(73) Assignee: Aisin AW Co., Ltd. (JP)

(*) Notice: Subject to any disclaimer, the term of this patent is extended or adjusted under 35 U.S.C. 154(b) by 0 days.

(21) Appl. No.: 09/654,599

(22) Filed: Sep. 1, 2000

(30) Foreign Application Priority Data

Sep. 3, 1999 (JP) .......................................... 11-250331

(51) Int. Cl.[7] .............................................. G01C 21/00
(52) U.S. Cl. ...................... 701/208; 701/201; 701/207; 340/990; 340/995
(58) Field of Search .............................. 701/201, 207, 701/208, 209, 210, 211; 340/990, 995

(56) References Cited

U.S. PATENT DOCUMENTS

| | | | | |
|---|---|---|---|---|
| 5,874,905 A | * | 2/1999 | Nanba et al. | ............... 340/995 |
| 5,893,898 A | * | 4/1999 | Tanimoto | ................... 701/201 |
| 5,938,718 A | * | 8/1999 | Morimoto et al. | .......... 701/201 |
| 5,983,158 A | * | 11/1999 | Suzuki et al. | ............... 701/209 |
| 6,098,015 A | * | 8/2000 | Nimura et al. | ................. 701/9 |
| 6,108,604 A | * | 8/2000 | Fukaya et al. | .............. 701/211 |

* cited by examiner

Primary Examiner—William A. Cuchlinski, Jr.
Assistant Examiner—Marthe Y. Marc-Coleman
(74) Attorney, Agent, or Firm—Lorusso & Loud

(57) ABSTRACT

A navigation system includes an information storage unit that stores map data including fork pattern data. A retrieval device obtains fork information from the map data and retrieves the connection between an entrance lane and an exit lane and the number of lanes at an approaching fork. A fork schematic drawing generation device generates a schematic drawing of a approaching fork by a selecting a fork pattern based on the connection between the entrance and exit lanes and the number of lanes that have been retrieved.

6 Claims, 8 Drawing Sheets

FIG. 3(a)

Road name data

| Road type | Type | number |
|---|---|---|
| Highway | Main line | 1 |
| | Sub-line | 2 |
| Urban highway | Main line | 3 |
| | Sub-line | 4 |
| Tollway | Main line | 5 |
| | Sub-line | 6 |
| National road | | 7 |
| Prefectural road | | 8 |
| Others | | 9 |

FIG. 3(b)

| Link type | Code |
|---|---|
| Main line → Main line | 0 |
| Main line → JCT | 1 |
| Main line → Ramp | 2 |
| Main line → SA | 3 |
| JCT → Main line | 4 |
| JCT → JCT | 5 |
| JCT → Ramp | 6 |
| JCT → SA | 7 |
| ---------- | ----- |

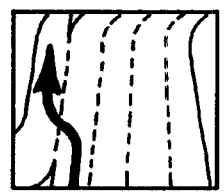
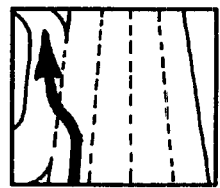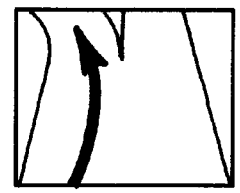
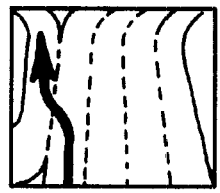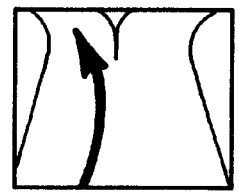
FIG. 5(a)    FIG. 5(b)
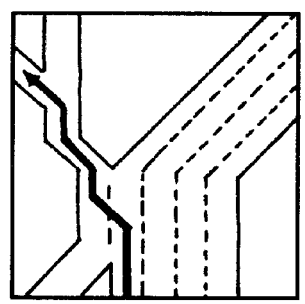
FIG. 5(c)

NAVIGATION SYSTEM AND STORAGE MEDIUM

BACKGROUND OF THE INVENTION

1. Field of the Invention

This invention relates to a navigation system and method for providing lane guidance by the use of fork schematic drawings made in accordance with data on a fork pattern, and relates to a storage medium therefor.

2. Description of the Related Art

In a conventional navigation system, lane guidance has been provided for, at a predetermined distance before a fork when a vehicle is running on an expressway or the like, giving the driver a guidance on which lane to take, by displaying arrows on fork schematic drawings. The fork schematic drawings prepared as lane-guiding data in a database have been hitherto determined by manual labor based on a field survey.

In addition, a lane-guiding method has been proposed in which a storage medium that stores guiding data is accessed when running, and data on the number of lanes at a predetermined distance before a fork and data on the number of lanes immediately before the fork are extracted, so that a fork schematic drawing is calculated and displayed for lane guidance.

However, the manner of manual labor based on the field survey entails high cost and much time, and therefore is extremely inefficient for collecting data. Also, because the data are collected by manual labor, the data quality easily varies depending on the surveyor.

On the other hand, with the method in which the fork schematic drawing is calculated when running, the calculation cannot be finished in time in, for example, Germany where the average velocity of vehicles is extremely high, so that a case occurs in which lane-guiding information cannot be provided opportunely to the driver.

SUMMARY OF THE INVENTION

It is therefore an object of the present invention to digitize lane-guiding information efficiently. Additionally, it is another object of the present invention to opportunely provide lane-guiding information even when running at a high speed.

According to a first aspect of the invention, a navigation system comprises information storage means for storing map data including fork pattern data, retrieval means for acquiring fork information from the map data and retrieving a connection between an entrance lane and an exit lane and a number of lanes at an acquired fork, and fork schematic drawing generation means for generating a schematic drawing of a corresponding fork by selecting fork pattern data based on the connection between an entrance lane and an exit lane and the number of lanes that have been retrieved.

According to a second aspect of the invention, the fork schematic drawing generation means judges whether or not there is a merging point within a predetermined distance before the fork and, if there is a merging point, it is added to the fork schematic drawing.

According to a third aspect of the invention, the fork schematic drawing generation means judges whether or not there is another fork within a predetermined distance after the fork and, if there is another fork, a successive fork schematic drawing is generated by adding it to the fork schematic drawing.

According to a fourth aspect of the invention, a navigation system for route-guidance on a road whose name differs depending on the district comprises district judging means for judging which district a fork belongs to, and guide means for guiding a driver using the name of the road in accordance with the district to which the fork belongs based on the result of judgement by district judging means.

According to a fifth aspect of the present invention, a method for displaying navigation data comprises the steps of acquiring fork information from map data, retrieving a connection between an entrance lane and an exit lane and the number of lanes at an acquired fork, and generating a schematic drawing of a corresponding fork by selecting fork pattern data based on the connection between an entrance lane and an exit lane and the number of lanes that have been retrieved.

BRIEF DESCRIPTION OF THE DRAWINGS

FIGS. 3(a) and 3(b) each show an example of the road data structure in the present invention.

FIGS. 5(a) to 5(c) are views for explaining the generation of a schematic drawing in a situation in which forks are successive.

DESCRIPTION OF THE PREFERRED EMBODIMENTS

Figure 1:
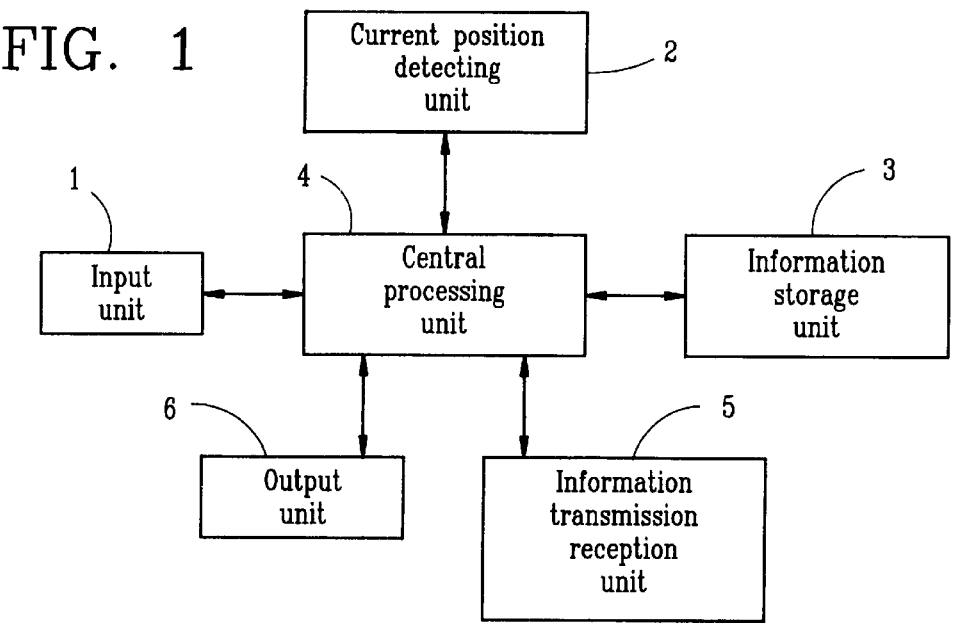
FIG. 1 shows an example of the construction of the navigation system of the present invention.

An embodiment of the present invention will be described hereinafter. FIG. 1 shows an example of the construction of the navigation system of the present invention. The navigation system includes an input unit 1 for inputting information about a route guide; a current position detecting unit 2 for detecting information about the current position of a vehicle; an information storage unit 3 for storing navigation data required for the calculation of the route, display/voice guide data required for the route guide, and programs (application and/or OS); a central processing unit 4 for route search processing, data generation required for the route guide, display/voice guide processing required for the route guide, and controlling the entire system; an information transmission-reception unit 5 for transmitting/receiving information about the progress of the vehicle, that is, for example, road information or traffic information, detecting information regarding a current position of the vehicle, and transmitting/receiving information about the current position of the vehicle; and an output unit 6 for outputting information about the route guide.

The input unit 1 is provided with a function for inputting a destination and instructing the central processing unit 4 to perform navigation processing in accordance with a driver's intention. As a means for realizing this function, use can be made of a remote controller, such as a touch switch or jog dial, by which a destination is input in the form of a telephone number or coordinates on a map, and a route guide is requested. Additionally, in the present invention, a device for carrying out a dialogue by voice input is provided. This serves as a voice input device. Also, a recording-card reading device for reading data stored in an IC card or a magnetic card may be added. Further, a data transmission device for exchanging data between a driver and an information center from which stored data required for navigation is furnished through a transmission link according to the demand of the driver or between the driver and an information source, such as a portable electronic device, that has map data, destination data, and data on a simplified map or a building shape map may also be added.

The current position detecting unit 2 includes a GPS receiver for calculating the current position, traveling speed, or absolute bearing of the vehicle with the aid of a global positioning system (GPS), a beacon receiver for receiving information about the current position, lanes, and the like, a data receiver for receiving a correction signal of the GPS with the aid of a cellular phone or an FM multiple signal, an absolute bearing sensor for detecting the direction of travel of the vehicle by the absolute bearing with the aid of, for example, terrestrial magnetism, a relative bearing sensor for detecting the direction of travel of the vehicle by the relative bearing with the aid of, for example, a steering sensor or a gyro sensor, and a distance sensor for detecting a mileage from, for example, the number of revolutions of the wheels.

The information storage unit 3 stores programs and data for navigation. For example, this is an external storage medium, such as CD-ROM, DVD-ROM, floppy disk, or memory card. Instead, this may be an internal memory, such as a built-in type ROM or flash memory. The programs are a program for executing the processing of, for example, route search, a program for carrying out a guide interactively by voice input, a program for performing display/voice output control required for a route guide, and a program for retrieving locations or facilities. The stored data are filed as map data, search data, map-matching data, destination data, registered position data, road data, image data on forks, such as intersections, based-on-genres data, and landmark data. All the data required for the navigation system are stored. It is noted that the present invention is applicable to a type in which only data is stored in a CD-ROM and programs are stored in a CPU, or a type in which data and programs are taken in by transmission from the outside.

The central processing unit 4 includes a CPU for executing various arithmetic processing, a flash memory for reading the program from the CD-ROM of the information storage unit 3 and storing it, a ROM for storing a program (program reading means) for executing the program check and updating the flash memory, and a RAM for temporarily storing searched route guide information about position coordinates of a predetermined destination and road name code numbers. The central processing unit 4 further includes a speech processor for executing interactive processing by voice input from the input unit 1 or synthesizing voices, phrases, complete sentences, and sounds that have been read from the information storage unit 3 based on a voice output control signal from the CPU, and thereafter converting it into an analog signal for output to a speaker; a communication interface for exchanging input-output data by communication; a sensor input interface for taking in a sensor signal of the current position detecting unit 2, and a clock for writing the date and time in internal diagnosis information (each not shown). The update executing program may be stored in the external storage medium.

All the programs according to the present invention and the other programs for executing navigation may be stored in the CD-ROM which is an external storage medium, or a part or all of the programs may be stored in the ROM 42 built in the system. The data and programs stored in the external storage medium are input to the central processing unit of the system and undergo arithmetic processing, and thereby various navigation functions are realized.

As mentioned above, the navigation system of the invention has a relatively large capacity flash memory for reading the programs from the CD-ROM of the external storage medium and a small capacity ROM that stores the programs (program reading means) according to which the starting process of reading of a CD is performed. The flash memory is a storage means in which stored information is retained even when the power is turned off, namely, a nonvolatile storage means. For starting the reading process of the CD, the program of the ROM which is a program reading means is started, the programs stored in the flash memory are then checked, and disk management information and the like of the CD-ROM of the information storage unit 3 is read. Loading processing (update processing) of the programs is executed upon judgement of this information and the state of the flash memory.

The information transmission-reception unit 5 includes a GPS receiver for obtaining information with the aid of the global positioning system (GPS), a VICS information receiver for obtaining information with the aid of FM multiple broadcasting, a radio wave beacon, and a light beacon, and a data transmission-reception device for bi-directional communication of information between the driver and an information center (ATIS, for example) or other vehicles with the aid of portable telephones and personal computers.

The output unit 6 has a function for outputting guide information in the form of voice and/or image when the driver needs it or for performing the printout of, for example, data that have undergone navigation processing by the central processing unit 4. As means for this, there are provided a display for displaying an input data image or route guide image, a printer for printing the data processed by the central processing unit 4 or the data stored in the information storage unit 3, and a speaker for outputting the route guide in the form of a voice.

The display, which includes a simplified liquid crystal display or the like, displays an intersection enlarged-view image based on the map data or guide data processed by the central processing unit 4, destination name, time, distance, and an arrow that indicates the direction of travel, and the like. By sending the image data as a bit map data to the display, it is possible to use a transmission line that is used in serial communication or combinedly use other transmission lines without using a dedicated image signal line. The display can be provided with a memory that stores bit map data temporarily.

The display is disposed in an instrument panel near the driver's seat. The driver can confirm the current position of the vehicle or obtain information about an upcoming route by looking at the display. A tablet, such as a touch panel or touch screen, can be used as a screen of the display so as to input position data or road data by touching or tracing the screen.

A description will be provided of the flow of the entire system of the navigation system of the present invention. When the central processing unit 4 reads the program from the information storage unit 3 and thereby the program of the route guide is started, the current position detecting unit 2 detects the current position of the vehicle, and a map of the surrounding area that centers on the current position is displayed, and, in addition, the name or the like of the current position is displayed. Thereafter, a destination is set by using a target name, such as place name or facility name, telephone number, address, registered point, and road name, and the route from the current position to the destination is searched. After the route is determined, the current position detecting unit 2 traces the current position, and, at the same time, the route guide and display are repeatedly carried out until the vehicle reaches the destination. If a detour setting is input before it reaches the destination, a searched area is set so as to execute research in the searching area, and, likewise, the route guide process is repeatedly carried out until the destination is reached. Further, in the present invention, basic fork pattern data are stored, and, by a combination of the data, a guide schematic drawing of the fork is generated.

Figure 2:
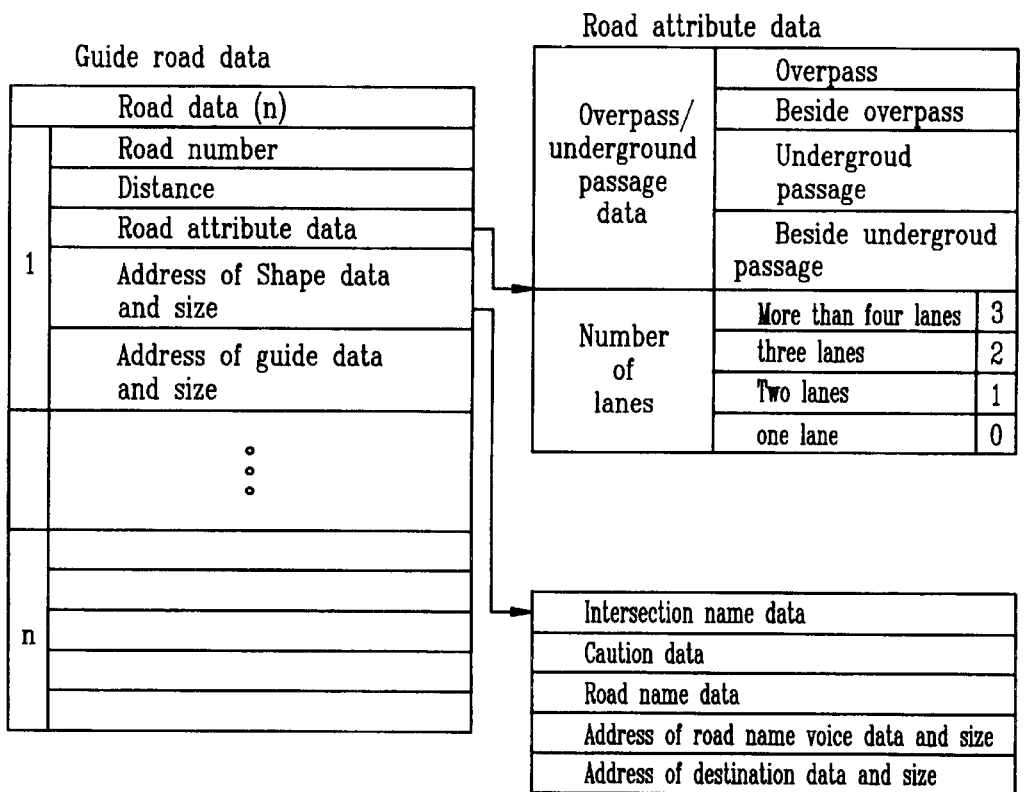
FIG. 2 shows an example of a road data structure in the present invention.

FIGS. 2, 3(a), and 3(b) each show an example of a road data structure in the present invention.

A guide road data file in which data required to calculate a route and guide it are stored includes, in each road data record (n), data on road number, distance, road attribute data, address of shape data, address of size and guide data and size. The road number is set by directions (forward, backward) for each road between the forks. The road attribute data indicates information about whether the road is on an overpass, whether it is beside the overpass, whether it is in an underground passage, or whether it is beside an underground passage, and about the number of lanes. The data about the number of lanes is provided with code numbers according to the number of lanes. The shape data has coordinate data that is comprised of an E-longitude and an N-latitude to each of node numbers (m) when each road is divided by a plurality of nodes. The guide data includes data on intersection (or fork) name, caution data, road name data, address of road name voice data, address of size and destination data and size. The road name data in addition to identifying the intersecting road includes data on the current road type and the link type. As shown in FIG. 3(a), the current road type is a road type number determined based on information (illustrated in the table below the road type) about whether it is an expressway, urban expressway, tollway, or ordinary road (e.g., national road, prefectural road, and others), and information about whether it is a main line or sub line in the expressway, urban expressway, and tollway. The link type is, as shown in FIG. 3(b), a code indicating the connection among the roads, such as shown in the table below the link type as main line→main line, main line→JCT, main line→ramp, main lines→SA (service or rest area), JCT→main line, JCT→JCT, JCT→ramp, or JCT→SA.

Figure 4A:
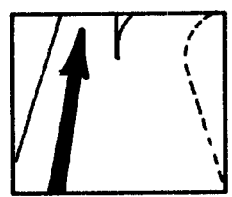
FIGS. 4(a) to 4(h) are views for explaining a guide pattern at a fork on an expressway.
Figure 4B:
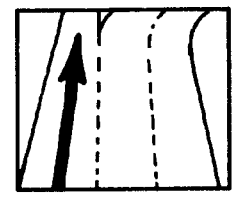
Figure 4C:
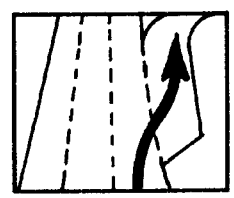
Figure 4D:
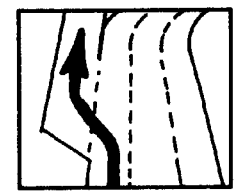
Figure 4E:
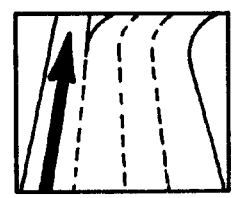
Figure 4F:
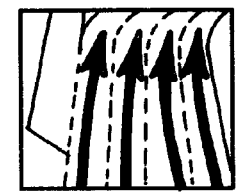
Figure 4G:
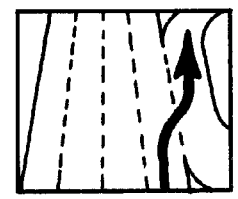
Figure 4H:
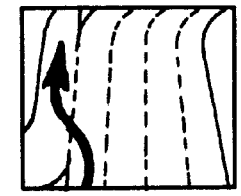

FIGS. 4(a) to 4(h) are views for explaining data on guide patterns at forks on an expressway. In the present invention, fork patterns are extracted from map data, and are kept as universal pattern data. Fork guidance is carried out by the use of the pattern data. FIGS. 4(a) to 4(h) are basic fork patterns extracted from the map data. FIG. 4(a) is a pattern in a case in which a lane branches into two roads, FIG. 4(b) is a pattern in a case in which three lanes branch into one lane and two lanes, FIGS. 4(c) and 4(d) are patterns in a case in which another lane branches from three lanes, FIG. 4(e) is a pattern in a case in which four lanes branch into one lane and a group of three lanes, FIG. 4(f) is a pattern of a case in which another lane branches from four lanes, and FIGS. 4(g) and 4(h) are patterns in a case where four lanes and one lane merge and then branch. In these figures, arrows indicate traveling lanes. When guidance on the fork is made by the use of these pattern data, if all that is required is to exhibit a basic pattern itself, the pattern is merely displayed on the guidance screen for guiding.

If there is a series of junctions, a schematic drawing is generated by a combination of these basic patterns for guiding. FIG. 5(a) shows three types of patterns in each of which four lanes and one lane merge and then branch, and FIG. 5(b) shows three types of patterns in each of which one lane branches into two roads. A schematic drawing of a successive fork pattern in which four lanes and one lane merge and then branch and, further, branch into two lanes is generated as shown in FIG. 5(c) by a combination of any one of the patterns of FIG. 5(a) and any one of the patterns of FIG. 5(b).

Figure 6:
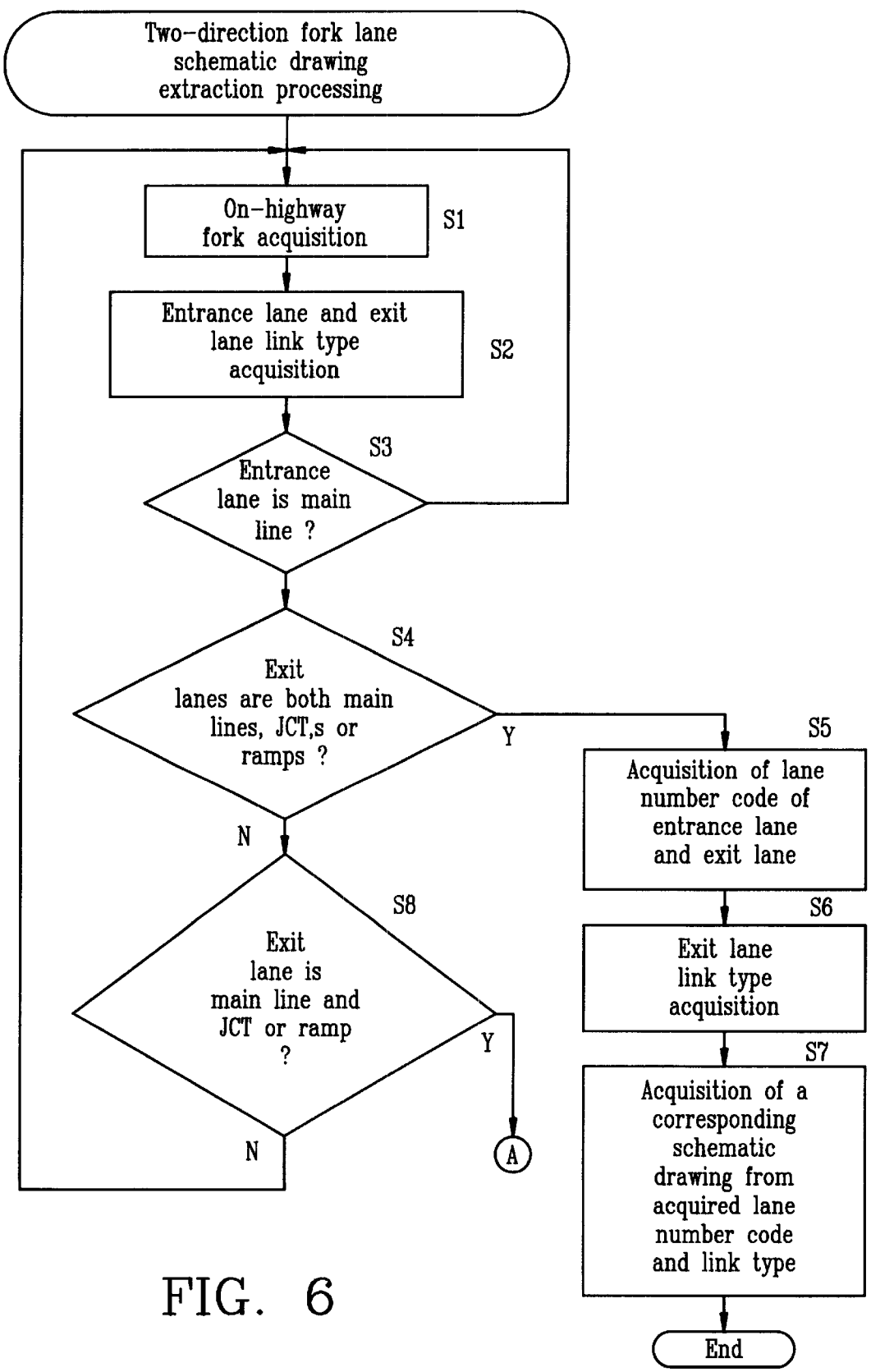
FIG. 6 shows a schematic drawing extraction processing flow of a two-direction fork lane on an expressway.
Figure 7:
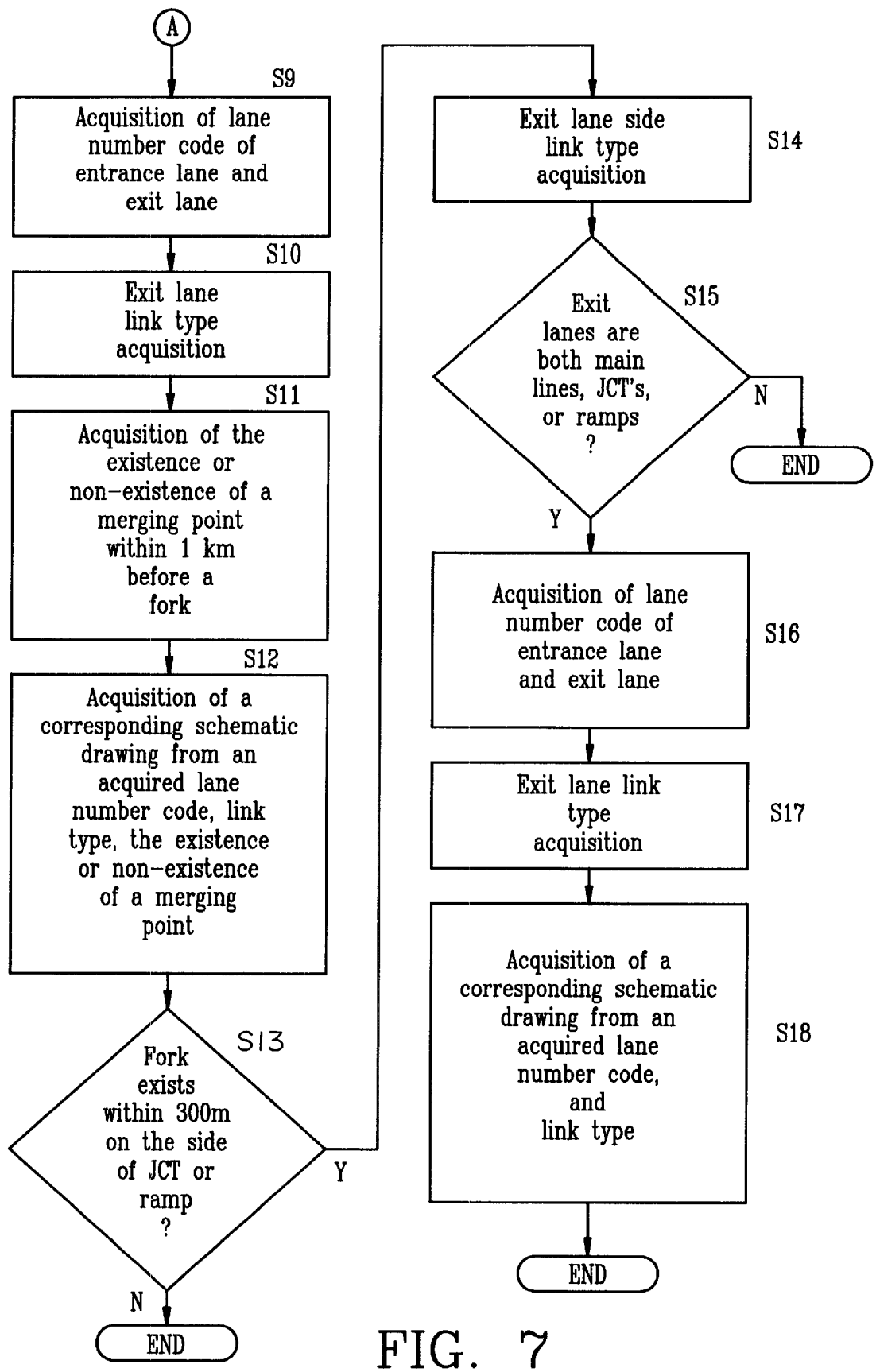
FIG. 7 shows a schematic drawing extraction processing flow of the two-direction fork lane on the expressway.

Next, a schematic drawing generation processing flow of branching will be described with reference to FIGS. 6 and 7. FIGS. 6 and 7 show a schematic drawing extraction processing flow of a two-direction branching lane in an expressway. In FIG. 6, the branching information about an approaching intersection in the expressway is retrieved and obtained from map data (S1), and the link type of an entrance lane to an exit lane is retrieved and obtained from the road data shown in FIGS. 2, 3(a), and 3(b) (S2). Thereby, data on connection of the entrance and exit lanes can be obtained. Thereafter, whether the entrance lane is a main line or not is checked from the road type number of FIG. 3(a) (S3). If not, the extraction processing of the schematic drawing is not carried out. The reason is that conventional guide processing is applicable when the entrance lane is not a main line. Thereafter, whether or not both of the entrance and exit lanes are a main line, junction (JCT), or ramp is checked from the link type code of FIG. 3(b) (S4). If this condition is satisfied, the lane number code (see FIG. 2) of the entrance and exit lanes is retrieved and obtained (S5). Thereby, branching from how many lanes to how many lanes can be understood. Further, the link type of the exit lane is retrieved and obtained (S6). A corresponding basic pattern shown in FIG. 4 is obtained based on the obtained lane number code and the obtained link type. A schematic drawing of corresponding branching or fork is acquired or generated from this pattern (S7). In S4, if either of the entrance and exit lanes is not a main line, junction (JCT) or ramp, whether or not one of the entrance and exit lanes is a main line is checked (S8). If not, the extraction processing of the schematic drawing is not carried out. If one of the entrance and exit lanes is a main line in S8, the step shifts to the processing shown in FIG. 7.

In FIG. 7, the lane number code of the entrance and exit lanes is retrieved and obtained (S9), and the link type of the exit lanes is retrieved and obtained (S10). Thereafter, whether or not there are merging points within 1 km before a fork is retrieved and obtained (S11). This is also for giving guidance on the merging points before the fork at the same time. A schematic drawing of corresponding branching is acquired from data on the lane number code, link type, existence of merging points that have been retrieved and obtained in this way (S12). Further, whether or not there are forks within 300 m on the side of the exit lanes (JCT or ramp) other than the main line is checked (S13). If not, the procedure ends, and the schematic drawing acquired in S12 is used as a guide pattern. If there are forks on the side of the exit lanes other than the main line in S13, the link type on the side of the exit lanes is retrieved and obtained (S14), and whether or not both the entrance and exit lanes are a main line, JCT, or ramp is checked (S15). If not, the procedure ends. If both the entrance and exit lanes are a main line, JCT, or ramp, the lane number code of the entrance and exit lanes is retrieved and obtained (S16), and, further, the link type of the exit lanes is retrieved and obtained (S17). Thereafter, a schematic drawing of corresponding branching is acquired from the lane number code and the link type that have been retrieved and obtained (S18). Then the schematic drawings acquired in S12 and S81 are combined to generate a combined schematic drawing (S19), e.g., the schematic drawing of successive branching shown in FIG. 5(c) is generated from the patterns of FIGS. 5(a) and 5(b).

Next, processing for giving guidance on a road name for guidance at a fork will be described with reference to FIGS. 8 to 11. In the road name guiding process of a conventional navigation system, road data is provided with a road attribute and road name data. With guidance at a fork, at a predetermined distance before the fork that requires guidance, road data after the fork is retrieved, based on predetermined route information that is stored in, for example, a RAM. And, road information is provided to the driver by displaying the road attribute and road name of the route after the fork or by voice output.

According to the road circumstances of a district, there is a case in which the name of a road differs depending on the district in spite of the fact that the road is the same one or has the same road attribute. For example, in American highways, some districts call the road a "Freeway" whereas some districts call the same one an "Expressway." In the conventional system, a measure is employed in that different road names are given depending on respective districts in order to guide and display such American highways. However, this leads to increase in the amount of data. Accordingly, in this embodiment, in the case where one road has the same road attribute but is named differently as mentioned above, means for judging the district the road is provided, and an arrangement is designed so as to provide information on the name corresponding to the district, thereby offering a detailed route guide with a small amount of data.

Figure 8:
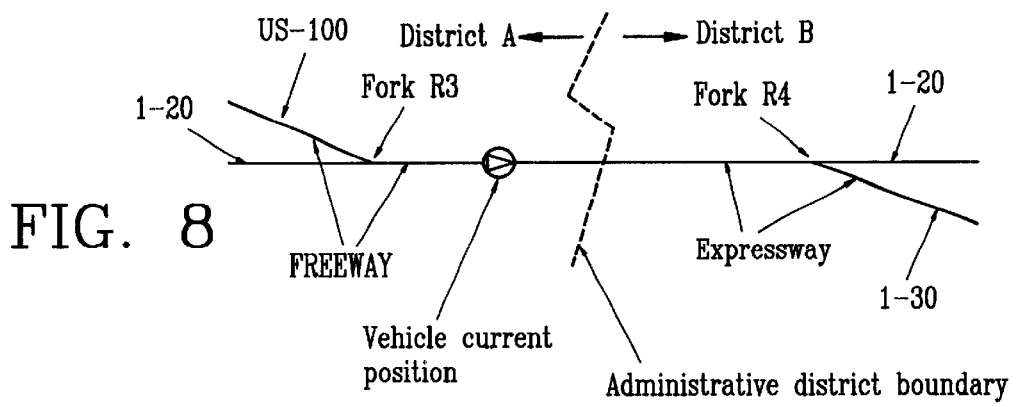
FIG. 8 explains an example in which the designation is different depending on the region in spite of the fact that the road is the same, or the road attributes are the same.

FIG. 8 schematically explains points that belong to the same road or have the same road attribute but are named differently depending on the district. In the figure, the solid line indicates a highway whose road number is I-20. The highway I-20 intersects with a road whose road number is U.S.-100 and a road whose road number is I-30 at a fork R3 and a fork R4, respectively. The highway I-20 extends beyond an administrative district boundary indicated by the broken line and through district A and district B. District A calls the highway as "Freeway," whereas district B calls it an "Expressway."

Figure 9:
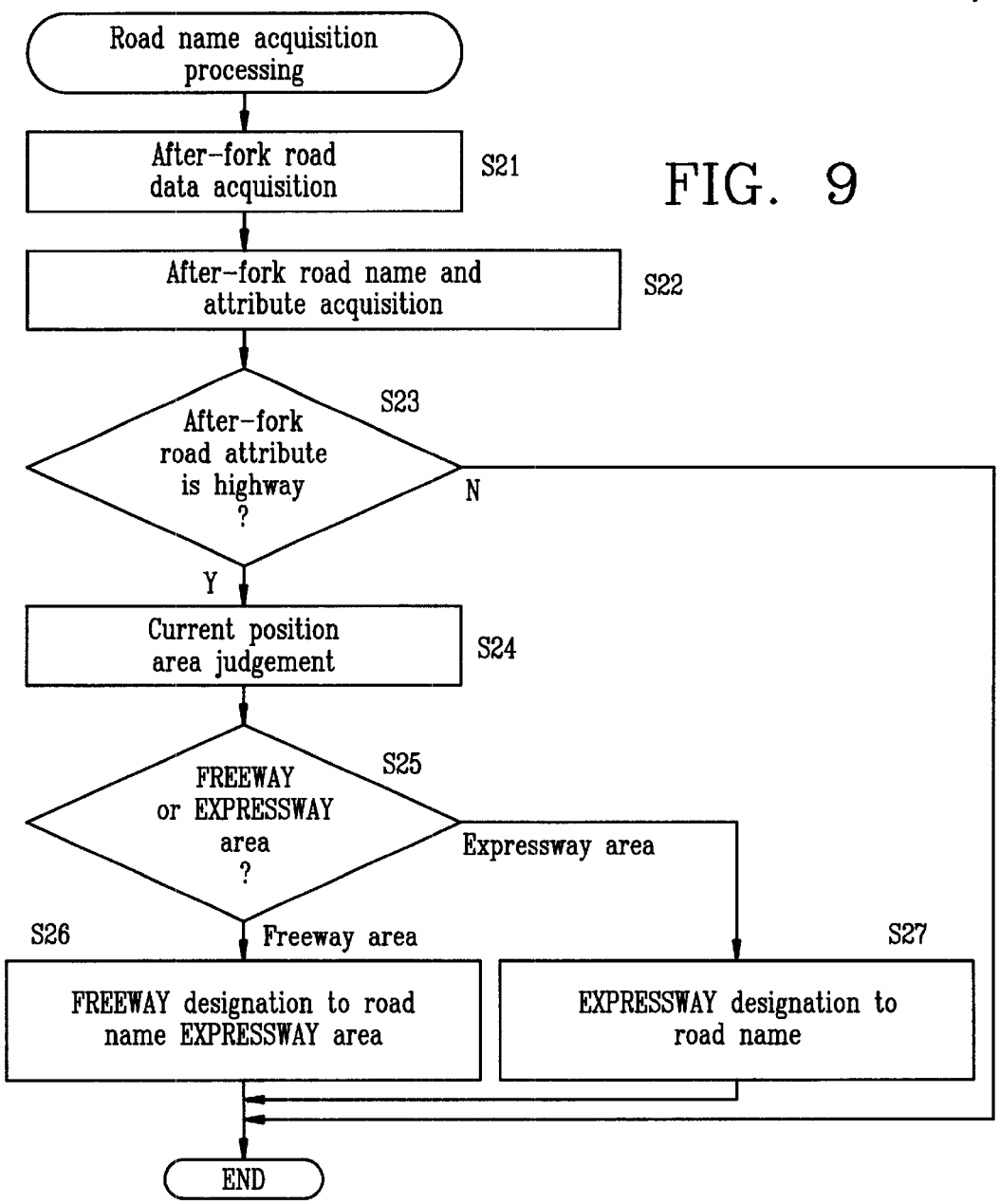
FIG. 9 shows the processing of road designation acquisition in fork guiding.

FIG. 9 shows the road name acquisition processing in fork guidance. First, in step 21, road data on the exit lane along a route of the exit lanes extending from a fork (guide intersection) that is a subject of guidance is obtained from the information storage unit 3, and, in step 22, a road name (or road number) and a road attribute in the road data are obtained. In step 23, whether or not the road attribute of the exit lane after the fork is a highway is judged. If it is a highway, whether an area of the current position is a "Freeway" area or an "Expressway" area is judged in step 24 and step 25. If it is a "Freeway" area, "Freeway" is given to the road name (S26), and, if it is a "Expressway" area, "Expressway" is given to the road name (S27). The acquired road name (or road number) to which "Freeway" or "Expressway" has been given is displayed or output in the form of a voice.

Figure 10:
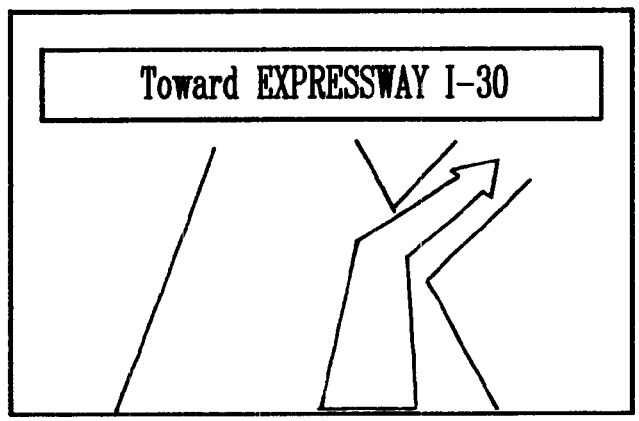
FIG. 10 shows an example that displays a schematic drawing of a fork in the fork guiding and the designation of a district to which the vehicle is directed after the fork.

FIG. 10 shows an example in which a schematic view of a fork in fork guidance and a name of the direction of travel after the fork are displayed. This is a case in which the road number of a road after exiting from a fork (herein, fork R4 of FIG. 8) of a subject of guidance is "I-30" in the processing of FIG. 9, and the current position is within the "Expressway" area.

In the above embodiment, in the fork guide processing, it was configured such that which name the area at the current position of the vehicle corresponds to is determined, concerning guidance at an exit lane after a fork. Instead, it may also be configured such that which area the position of an intersection or a fork that is a subject of guidance belongs to is determined. Describing this with reference to FIG. 8, the current position of the vehicle is in district A (i.e., "Freeway" area), and, when the fork R4 which is the next subject of guidance belongs to district B (i.e., "Expressway" area), the area to which the coordinates of the position of the fork which is the subject of guidance belong is judged for the road name acquisition processing in the guide output concerning the fork R4, instead of step 24 of FIG. 9.

As mentioned above, in the road data structure in a case where a structure is designed to judge in which district the road exists and provide information on the name corresponding to the district, road names, road numbers, and road attributes concerning the road data on each road are stored, and name information (e.g., "Expressway" or "Freeway") is stored together with district information, independently of the road data. Specifically, for example, information of the name of "Freeway" for district A and "Expressway" for district B are stored.

Additionally, data of each road can be stored, managed, and retrieved while being divided for each area. For example, the road data is divided into blocks in rectangular regions for storage, and district information for each block (district A or district B) is stored. Instead, road data may be divided for each administrative district, such as city, town, village, state, or country for storage, and they may be managed for each administrative district.

Concerning the current position area judgement processing in step 24 in FIG. 9 or concerning judgement processing of an area to which forks or intersections belong, a judgement on which district they belong to is made from the position coordinates of the current position or of a fork. When the road data (map data) is divided into blocks and is stored as mentioned above or when it is divided for each administrative district to be stored, a judgement on which district road data belongs to is made by a comparison between the coordinates of the current position or of the fork and the coordinate information on the block or the administrative district. In the former case, a road (section) on which the vehicle is now traveling may be judged, and a block or administrative district that contains the road (section) may be judged.

Further, information that indicates the section of district information may be provided beforehand to the road data. For example, on the road of road number I-20, information indicating that intersections 1 to 7 are contained in district A and intersections 7 to 13 are contained in district B is stored, and a judgement can be made about which of the sections contain the current position or the fork.

Figure 11:
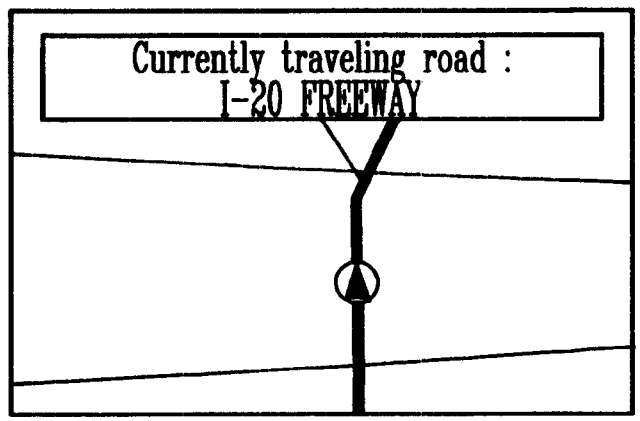
FIG. 11 explains a situation in which the road name and road number of a road on which the vehicle has been running and is now traveling is displayed for guidance.

In the above examples, guide processing at forks or intersections was described. However, as shown in FIG. 11, the present invention is applicable to an example in which the road name and road number of a road on which the vehicle is now traveling is displayed for guidance. In this example, means is provided for recognizing the road on which the vehicle is now traveling, and, in FIG. 9, the subject for which the road name or attribute is acquired can be replaced by the road on which the vehicle is now traveling.

In the above examples, description is given in the case of highways in U.S.A., however, the present invention is not limited to this. It is applicable to all the cases in which the name of the same type or attribute of a road, or the name of the same road varies depending on area. Further, in the above examples, a description was provided for two districts, district A and district B. However, it is applicable to three or more districts, of course.

As mentioned above, according to the present invention, branching pattern data that is more universal than map data is prepared beforehand, and typical patterns of, for example, successive branching are generated by a combination of the data. Accordingly, lane guide information can be efficiently digitized in the form of data, and the lane guide information can be exhibited opportunely even when traveling at a high speed.

The entirety of Japanese application No. Hei 11-250331 filed Sep. 3, 1999, inclusive of the specification, claims and drawings thereof, is incorporated herein by reference.

What is claimed is:

1. A navigation system comprising:

information storage means for storing map data including road data, a number of lanes for each road data, and fork pattern data;

retrieval means for acquiring fork information from the map data and retrieving a connection between an entrance and an exit at an acquired fork in the fork information and retrieving the number of lanes of each road data at the entrance and the exit; and fork schematic drawing generation means for generating a schematic drawing of a corresponding fork by selection of fork pattern data based on the connection between the entrance and the exit and displaying lanes at the entrance and the exit corresponding to the numbers of lanes that have been retrieved whereby when the number of lanes of one of the road data at the entrance and the exit is a plurality, said plurality of lanes is generated in the schematic drawing.

2. The navigation system according to claim 1, wherein said fork schematic drawing generation means judges whether or not there is a merging point within a predetermined distance before the fork and, if there is a merging point, it is added to the fork schematic drawing.

3. The navigation system according to claim 1, wherein said fork schematic drawing generation means judges whether or not there is another fork within a predetermined distance after the fork and, if there is another fork, a successive fork schematic drawing is generated by adding it to the fork schematic drawing.

4. A navigation system for route-guidance on a road whose name differs depending on the district, said navigation system comprising:

information storage means for storing map data including road data, a number of lanes for each road data, and fork pattern data;

retrieval means for acquiring fork information from the map data and retrieving a connection between an entrance and an exit at an acquired fork in the fork information and retrieving the number of lanes of each road data at the entrance and the exit; and fork schematic drawing generation means for generating a schematic drawing of a corresponding fork by selection of fork pattern data based on the connection between the entrance and the exit and displaying lanes at the entrance and the exit corresponding to the numbers of lanes that have been retrieved whereby when the number of lanes of one of the road data at the entrance and the exit is a plurality, said plurality of lanes is generated in the schematic drawing;

district judging means for judging which district a fork belongs to; and guide means for guiding a driver using the name of the road in accordance with the judgment of the district judging means for road information of an exit lane of the fork.

5. A method of displaying navigation data comprising the steps of:

acquiring fork information from map data on a storage medium;

retrieving a connection between an entrance and an exit;

retrieving a number of lanes at each road data at the entrance and the exit of the acquired fork information; and generating a schematic drawing of the acquired fork by selecting fork pattern data based on the connection between the entrance and the exit and displaying lanes at the entrance and the exit corresponding to the numbers of lanes that have been retrieved, whereby when the number of lanes of one of the road data at the entrance and the exit is a plurality, said plurality of lanes is generated in the schematic drawing.

6. A storage medium for a navigation system comprising a computer readable storage medium including:

map data including road data, a number of lanes for each road data, and fork pattern data; and a computer program including retrieval means for acquiring fork information from the map data, retrieving a connection between an entrance and an exit in the acquired fork information and retrieving a number of lanes for each road data at the entrance and the exit, and including fork schematic drawing generation means for generating a schematic drawing of a corresponding fork by selection of fork pattern data based on the connection between an entrance and an exit and displaying lanes at the entrance and the exit corresponding to the numbers of lanes that have been retrieved, whereby when the number of lanes of one of the road data at the entrance and the exit is a plurality, said plurality of lanes is generated in the schematic drawing.

* * * * *